| (12) | United States Patent<br>Boulbitch et al. | (10) Patent No.: US 10,383,178 B2<br>(45) Date of Patent: Aug. 13, 2019 |
|---|---|---|

(54) HEATING DEVICE FOR CURVED SURFACES

(71) Applicant: IEE International Electronics & Engineering S.A., Echternach (LU)

(72) Inventors: Alexei Boulbitch, Igel (DE); Thomas Wittkowski, Abentheuer (DE)

(*) Notice: Subject to any disclaimer, the term of this patent is extended or adjusted under 35 U.S.C. 154(b) by 3 days.

(21) Appl. No.: 15/563,868

(22) PCT Filed: Apr. 4, 2016

(86) PCT No.: PCT/EP2016/057361
§ 371 (c)(1),
(2) Date: Oct. 2, 2017

(87) PCT Pub. No.: WO2016/156617
PCT Pub. Date: Oct. 6, 2016

(65) Prior Publication Data
US 2018/0124875 A1 May 3, 2018

(30) Foreign Application Priority Data

Apr. 3, 2015 (LU) .......................... 92 690

(51) Int. Cl.
*H05B 1/02* (2006.01)
*H05B 3/34* (2006.01)
*B62D 1/06* (2006.01)

(52) U.S. Cl.
CPC ............... *H05B 3/34* (2013.01); *B62D 1/065* (2013.01)

(58) Field of Classification Search
CPC ........... B60L 1/02; H05B 1/0236; H05B 3/34; H05B 2203/014; H05B 3/0042

USPC .......................... 219/205, 203, 507, 497, 494
See application file for complete search history.

(56) References Cited

U.S. PATENT DOCUMENTS

| 7,109,862 | B2* | 9/2006 | Braeuchle | ................ B62D 1/06 |
|---|---|---|---|---|
| | | | | 340/561 |
| 9,346,480 | B2* | 5/2016 | Maguire | ................ B62D 1/046 |
| 10,124,823 | B2* | 11/2018 | Van'tZelfde | ......... H03K 17/962 |
| 2013/0062329 | A1 | 3/2013 | Morita | |
| 2013/0092677 | A1* | 4/2013 | Virnich | ................ B60N 2/5685 |
| | | | | 219/204 |
| 2013/0098890 | A1* | 4/2013 | Virnich | ................ B60N 2/5685 |
| | | | | 219/204 |
| 2013/0248513 | A1 | 9/2013 | Morita | |
| 2014/0175078 | A1 | 6/2014 | Davignon et al. | |
| 2014/0224059 | A1 | 8/2014 | Morita et al. | |

OTHER PUBLICATIONS

International Search Report for International application No. PCT/EP2016/057361, dated Jul. 1, 2016, 5 pages.
Written Opinion for International application No. PCT/EP2016/057361, dated Jul. 1, 2016, 6 pages.

* cited by examiner

*Primary Examiner* — Mark H Paschall
(74) *Attorney, Agent, or Firm* — Reising Ethington P.C.

(57) ABSTRACT

A composite heating device for homogeneous heating of surfaces, especially curved surfaces, such as in particular for homogeneous heating of steering wheels, the composite heating device having a heating element and a multipart thermally conductive layer that includes at least two thermally conductive portions with different thermal conductivities, a first portion of the thermally conductive portions being in contact with the heating element. Steering wheel integrating such a composite heating device.

18 Claims, 5 Drawing Sheets

HEATING DEVICE FOR CURVED SURFACES

TECHNICAL FIELD

The present invention generally relates to heating devices, in particular for homogeneously heating curved surfaces, such as for steering wheels in the automotive field.

BACKGROUND ART

It is well known within the art to provide devices allowing heating steering wheels or other (curved) surfaces.

During construction of heating devices for a steering wheel the skilled person faces three major problems. If the heating device comprises wires, they can be visible, even if there are additional layers placed above the heating device, such as foam and natural or artificial leather. The wires can also be felt by the user. Reducing their thickness is not an option as, the wires are being subjected to strong stresses during the manufacturing process and while driving. These stresses often cause damage to the wires, which gives rise to an inhomogeneous heating, to the failure of the device or even worse to local overheating.

Some solutions propose the use of heating elements essentially comprising a rectangular shaped knit network of wires. When they are applied to a toroidal rim, some parts are stretched, while others are compressed. This gives rise to the inhomogeneity of the local density of the wires along with a significant heat inhomogeneity.

The electrical heating may, further, be achieved using a printed conductive layer or pattern. It can either be printed over the steering wheel rim itself, or can be first printed on a substrate and then applied to the rim. In the former case printing is difficult, and, therefore, expensive. In the latter case application of the substrate to the toroidal surface gives rise to substrate buckling or folding, which is undesirable, since it also can be sensed at least tactilely. Such an approach requires in any event specially shaped cuts to be applied to the substrate.

A further option is to apply a conductive paste directly onto the steering wheel rim making a certain pattern, thus avoiding the buckling/folding problem. This has, however, the drawback that application of the paste onto a complex toroidal surface is a work-consuming task increasing the steering wheel price.

All the above presented solutions strive to evenly distribute the heating sources along the steering wheel surface in order to generate the heat at the rim as homogeneously as possible. However, this, in itself, creates a problem, since the steering wheel not only has a complex toroidal surface, but there are more parameters which have to be taken into account, as determined by the present inventors and explained below.

SUMMARY

It is an object of the present invention to provide an alternative heating device which allows overcoming at least some of the above-mentioned problems: to put forward a heating device for curved surfaces, such as a steering wheel heating device, which provides a homogeneous temperature along the curved surface, which is inexpensive to manufacture and which can be easily applied to a steering wheel in a buckling/folding-free way.

In order to overcome at least some of the above-mentioned problems, the present invention on one aspect provides a composite heating device for homogeneous heating of surfaces, especially a curved surface, such as in particular for homogeneous heating of steering wheels, the composite heating device comprising a(n electrical) heating element and a multipart highly thermally conductive layer comprising at least two thermally conductive portions with different thermal conductivities, a first portion of said at least two thermally conductive portions being in contact with the heating element.

It is to be noted that the composite heating device may comprise more than one heating element if desired or necessary, depending on the intended use. Furthermore, the heating element in at least some embodiments of the present invention is small in size/surface as compared to the multipart thermally conductive layer and usually represents only 2 to 40%, preferably between 5 and 30%, more preferably less than 20% of the surface of the multipart layer. This is particularly advantageous in applications where the surface of curved shapes is to be heated in a uniform and homogeneous fashion. Indeed, the heating element itself is generally less flexible than the portions of a multipart thermally conductive layer as described herein. Hence, despite a reduction of the size of the heating element to only a small fraction of the surface to be heated, an efficient and uniform heating may be achieved, as will be further detailed herein.

Furthermore, it has been determined by the inventors that in many applications, the surfaces to be heated do not only have complex surfaces, such as steering wheels, but they have an orientation with respect to the force of gravity. This orientation (or tilt) is important, since the surface's temperature is formed in the course of a heat exchange in which the free air convection takes an important part. The latter strongly depends upon the tilt of the surface with respect to the gravity force. Thus, the known homogeneous distribution of heating elements inevitably generates an inhomogeneous temperature distribution.

The design of the disclosed embodiments is thus based on an opposite paradigm. That is, to generate the heat locally, but to provide its lateral redistribution along the surface in order to achieve a temperature, homogeneous along the whole surface by providing portions with differential thermal conductivities to take into account parameters such as ambient air convection.

These advantages, as well as other benefits of the invention will become apparent to the skilled person from the description and the drawings provided herein.

In the present context, the number of thermally conductive portions within the multipart thermally conductive layer is at least two, but may be three, four, five, six or more, as desired or necessary. The (subsequent) portions not in direct contact with the heating element(s) may also be referred to herein as second, third, fourth, fifth, sixth, etc. (thermally conductive) portions.

Preferably, the first portion, i.e. that portion being in contact with the heating element, is the thermally conductive portion having a high thermal conductivity, in particular the highest thermal conductivity as compared to the subsequent portions. In a particularly preferred embodiment, the thermal conductivity of the first portion expressed in W/(m·K) being preferably at least 100%, more preferably at least 150%, still more preferably at least 200% above that of the other (subsequent) portion(s). Usually, the thermal conductivity of the first portion expressed in W/(m·K) is however not more than 450%, more preferably not more than 400% above that of the other (subsequent) portion(s).

The first and second portions (and further portions if present) of the multipart layer with the high thermal conductivity together preferably represent a closed surface without interruptions (i.e. covering essentially the whole surface to be heated, i.e. generally at least 90% of the surface to be heated).

As to the material of the highly thermally conductive portions, it can be any material with an appropriate thermal conductivity, generally above 10 W/(m·K), preferably above 50 W/(m·K), more preferably above 100 W/(m·K) and most preferably above 200 W/(m·K) [at 20° C], such as metal foils, conductive ink, conductive paste, conductive paint, polymer sponge filled with metallic particles, carbon nanotubes-based or graphene-based material, positive thermal coefficient (PTC) materials and any other suitable material.

In a further aspect, the composite heating device has a first portion made from a material which is the same than that of a further of the thermally conductive portion(s), the thermal conductivity of the other portion(s) being adapted by the provision of microstructures within said portion, the microstructures being preferably selected from any one or more of voids, slits, cuts, holes and insulating inclusions.

Hence, the first, the second (and the subsequent) portions may be manufactured out of the same material, if the thermal conductivity of those latter portions is varied, preferably decreased by providing voids, slits, holes, cuts or/and insulating inclusions. Such voids can e.g. be perforated during— and represent a part of—the manufacturing process.

One may also manufacture the second (and subsequent) portion of the highly thermally conductive layer out of a material different from that of its first portion, and, additionally, introducing the voids, holes, cuts and/or inclusions.

Hence, in an alternative aspect, the first portion is made from a material which is different from that of a further of the thermally conductive portion(s), in other words it is made from another material having another thermal conductivity. Optionally, the thermal conductivity of the other portion(s) may be further adapted by the provision of microstructures within said portion(s), the microstructures being preferably selected from any one or more of voids, slits, cuts, holes and insulating inclusions.

In particular, one can manufacture the first, second and subsequent portions of the layers with the high thermal conductivity using foils produced out of metals with different thermal conductivities. For example, the first portion of the high thermally conductive layer may be produced of a copper foil, while the second, third and subsequent portions are made out of an aluminum foil. The metal foil may have the thickness between 40 μm and 500 μm depending on the application. Usual thicknesses are between 45 μm and 400 μm, such as about 50 μm, more preferably about 100 μm, and even more preferably about 200 μm, or even about 300 μm. The thickness of the material of the second and subsequent portions may be chosen to be smaller than that of the first portion.

As to the way of application of the layers with the high thermal conductivity, any appropriate method may be used. In practice, the method depends upon the nature of this layer. For example, the layer produced out of a conductive ink may be screen printed or pad-printed. The conductive paint may be sprayed onto the rim, while a metallic highly thermally conductive layer, such as, for instance, a copper layer, nickel or another one, or a combination of metals may be applied by the galvanic method.

If the first portion of the multipart thermally conductive layer is manufactured of a foil, the latter may be glued onto the rim. To achieve that it can be provided with an adhesive surface to be directly glued onto the rim surface. In the latter case it may be necessary for curved shapes to subject the foil to lateral cuts to enable a smooth winding of the foil around the curves, such as around the toroidal surface of a steering wheel's rim. Such lateral cuts generally do not significantly prevent the lateral heat transfer along the surface, such as around the steering wheel cross-section, if the direction of the cuts is about parallel to the direction of the heat transfer; e.g. in the direction around the wheel cross-section for such applications. The foil may further consist of a number of fragments, each with the corresponding cuts, simplifying the foil application. One can preferably form the foil of four fragments, more preferably—of 6 fragments, even more preferably—of 8 fragments.

Hence, the second (or subsequent) portion of the multipart thermally conductive layer may be manufactured in a way and of a material different from those the first portion has been manufactured.

As already mentioned, a composite heating device as disclosed herein is particularly adapted for a highly homogeneous heating of surfaces. Due to its features it is further especially adaptable to curved surfaces, such as to steering wheels or similar. However, it is also suitable for use in the homogenization of the heat flow in other heating applications in the automotive field, like e.g. seat heating, panel heating or fuel tank heating, as well as in domestic or industrial applications.

Hence, in a still further aspect, the present invention also encompasses an article having one or more curved surfaces to be (homogeneously) heated, such as in particular a steering wheel with a rim, which comprises (beneath said surface(s)) a composite heating device as described herein. In the case of a steering wheel, the heating element is preferably but not necessarily arranged at the bottom part of the steering wheel's rim.

In a preferred embodiment, the steering wheel is such that the heating element and the multipart thermally conductive layer are arranged symmetrically with respect to the vertical plane of the steering wheel's rim.

Alternatively, the heating element(s) and the multipart thermally conductive layer may be arranged asymmetrically with respect to the vertical plane of the steering wheel's rim.

In a further advantageous aspect, the steering wheel comprising a number of composite heating devices fixed at different locations of the rim of the steering wheel, wherein the size, power, orientation and positioning of each heating element and/or the size, orientation and positioning of each of their thermally conductive portions are individually chosen, preferably such that the more powerful heating element(s) are located in the bottom part of the steering wheel. In other words, the steering wheel comprises a "fractioned" composite heating device, wherein not only the thermally conductive (heat-transport) layer in each fraction is chosen and oriented individually, but also the size, power and positioning of each heating element may also be individually chosen from fraction to fraction. In general, it is particularly advantageous that the heating element is positioned in the bottom part of the wheel. In the present context, the word "bottom" is understood as the lowest point of the rim cross-section by the vertical plane through the position of the heater, i.e. a position which is the lowest with respect to the gravity acceleration vector.

In a still further aspect, the steering wheel as described herein, is such that at least one thermally conductive portion of the multipart thermally conductive layer is part of a sensor. Such a sensor may be of any appropriate type, preferably the sensor is a capacitive sensor which may be advantageously arranged for hands-off detection. Using some or all elements from the composite heating device for other functionalities reduces the complexity during manufacturing, reduces weight and provides economic advantages without (significant) shortcoming.

Capacitive sensors are known as such and are called sometimes electric field sensor or proximity sensor. Such capacitive sensors designate sensors, which generate a signal responsive to the influence of what is being sensed (a person, a part of a person's body, a pet, an object, etc.) upon an electric field. Capacitive sensor (as any other sensor) need of course further components in order to be operational. Such further components are however known to the skilled person and not the object of the present invention.

The expression "hands-off detection" is used in the following to designate the detection of a cessation of the contact between the steering wheel and both of the driver's hands.

The portions (or some only) of the multipart thermally conductive layer may also be electrically conductive in addition to being thermally conductive.

If so, the portion(s) or the multipart thermally conductive layer as a whole may serve as an electrode in a capacitive sensor. In one such embodiment, the multipart thermally conductive layer serves as a first electrode for the hands-off detection.

Alternatively, the multipart thermally conductive layer may serve as a screen electrode for hands-off detection. In such a case, a further (additional) first electrode may be provided and preferably applied above said multipart thermally conductive layer with an intermediate insulating layer.

BRIEF DESCRIPTION OF THE DRAWINGS

Preferred embodiments of the invention will now be described, by way of example, with reference to the accompanying drawings in which.

Further details and advantages of the present invention will be apparent from the following detailed description of several not limiting embodiments with reference to the attached drawings.

DESCRIPTION OF PREFERRED EMBODIMENTS

Figure 1:
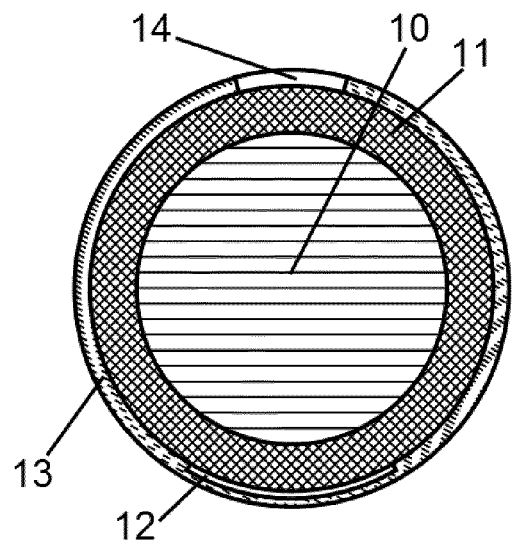
FIG. 1 is a schematic view of the first few layers of the steering wheel (not in scale), 10—an aluminum alloy rim core, 11—a polymeric layer covering the aluminum alloy core, 12—a heating element, 13—the first portion of the layer with the high thermal conductivity, 14—the second portion of the layer with another lateral thermal conductivity.

As it is visible from FIG. 1 presenting the steering wheel cross-section, one embodiment of the invention assumes an aluminum steering wheel core 10 covered by a layer 11 with low thermal conductivity (i.e. a thermally insulating layer) manufactured of a polymer, (such as, e.g. polyurethane or any other suitable one). A heating element 12 is placed at the bottom of the polymer layer 12. The first portion of the layer with the high thermal conductivity, 13, is placed over the heating element. This layer is interrupted by the second portion of the layer with the high conductivity 14. FIG. 1 shows a configuration symmetrical with respect to the vertical plane. This configuration is preferably applicable in the bottom and the top portions of the steering wheel. Except expressly otherwise indicated, terms such as top and bottom, above and below, horizontal and vertical, as used to describe the general invention and the illustrated embodiments have their ordinary and usual meanings and are applied to the respective features as they would normally be oriented in their actual application or in the drawings, depending on the context.

Figure 2:
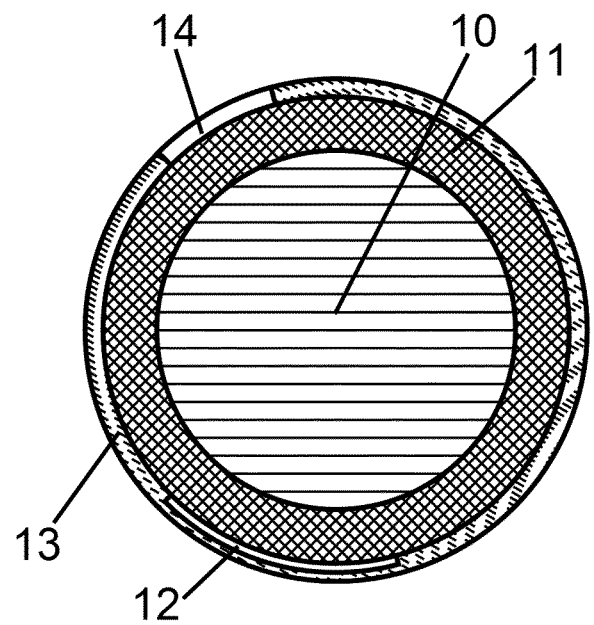
FIG. 2 is schematic view of the first few layers of the steering wheel in another embodiment with the asymmetric disposition of the heating element and the second portion of the layer with the high thermal conductivity, 10—an aluminum alloy rim core, 11—a polymeric layer covering the aluminum alloy core, 12—a heating element, 13—the first portion of the layer with the high lateral thermal conductivity, 14—the second portion of the layer with another lateral thermal conductivity.

An asymmetric configuration of the electrodes and the layer with the highly conductive material is shown in FIG. 2. All notations coincide with those of FIG. 1. The difference is that in this case the position of the heating element is rotated clockwise, while that of the second portion of the highly conductive layer is rotated counter-clockwise. The skilled person will immediately also imagine a configuration which is rotated in the reversed direction (not shown), that is the position of the heating element rotated counter-clockwise, while that of the second portion of the highly conductive layer is rotated clockwise is also applied.

Figure 3:
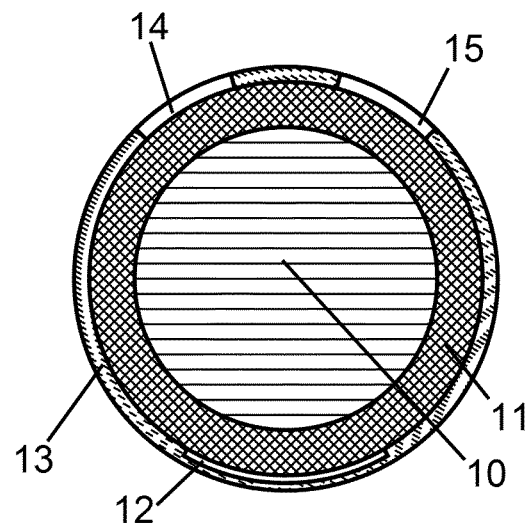
FIG. 3 is a schematic view of the first few layers of the steering wheel in still another embodiment with the second and the third portions of the layer with the high thermal conductivity, 10—an aluminum alloy rim core, 11—the polymeric layer covering the aluminum alloy core, 12—a heating element, 13—the first portion of the layer with the high lateral thermal conductivity, 14—the second and 15—a third portions of the layer with another lateral thermal conductivity

FIG. 3 presents a steering wheel cross-section with a composite heating device comprising more than two thermally conductive portions. The thermally conductive layer comprises first portion 13 in contact with the heating element 12, as well as second and third portions 14, 15. The other features of FIG. 3 are equivalent to those of FIG. 1 or 2.

Figure 4:
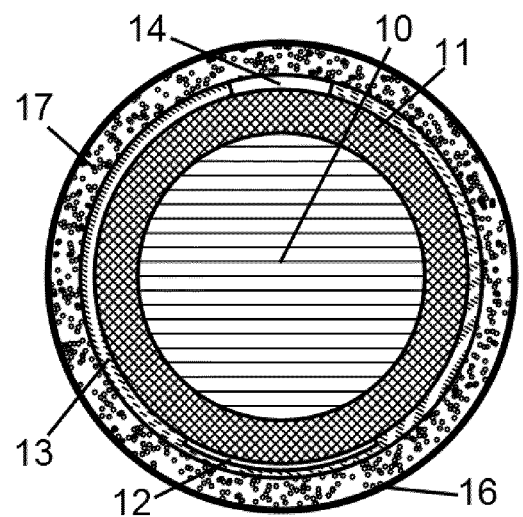
FIG. 4 is a schematic view of the cross-section of the steering wheel (not in scale), wherein 10 to 14 show the same as in FIG. 1, 17—a polymeric foam, 16—a leather layer or that of another material covering the steering wheel.

FIG. 4 shows the complete cross-section of the steering wheel including the aluminum steering wheel core 10 covered by the thermally insulating polymer layer 11, the heating element 12 placed at the bottom of the polymer layer 11, the first and the second portions of the highly thermally conductive layer, 13 and 14, the foam made out of a polymer material, such as, e.g. polyurethane foam, and a cover layer manufactured of natural or artificial leather.

The present invention does not specify the design of the heating element. It is only important that the heating element should provide a local heating. The heating element may have preferentially the width of about two centimeters down to a few millimeters. It may consist of a single wire, or of a stripe constructed of wires.

More preferentially, it may be printed directly on the rim using the screen printing or pad printing. One can preferentially use a carbon black ink. Even more preferred the embodiment with the heating element printed with the silver ink.

Figure 5:
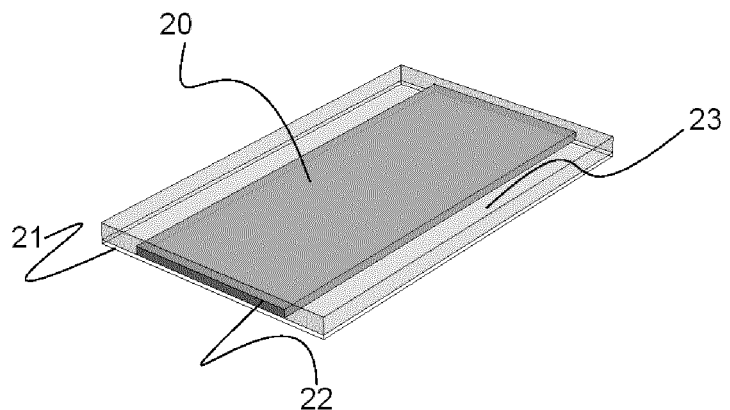
FIG. 5 shows one of the embodiments of the heating element 20 comprising a substrate 21, a conductive layer 22 and an isolating layer 23.

Still more preferred is the heating element shown as 20 in FIG. 5. The element 20 represents a thin polymeric substrate on top of which a conductive line 21 is printed, and covered by an insulating layer 22. The substrate 21 is supplied by the adhesive surface at its bottom enabling its application onto the rim. Its small lateral width ensures its smooth application without folds and buckling.

The conductive line can be produced using any suitable method. It can be printed, preferentially by inkjet printing, still more preferably, it can be screen-printed onto substrate.

As for the materials, the substrate can be manufactured of any suitable polymer or textile. Its thickness should be below 200 µm. More preferentially, it should be below 150 µm, still more preferentially it should be below 100 µm. The conductive line can be printed using any suitable ink. Preferentially, it can be produced of a silver ink. Its thickness may be any providing the necessary value of the electrical resistance. Preferentially, it should be 5 µm thick, still more preferentially it should be 10 µm thick, even more preferred it should be 20 µm thick.

As for the insulating layer, it may be produced by any suitable technology. For instance it can be printed over the conductive line using the ink-jet printing, or screen printing or any other technology suitable for this purpose.

More preferred, the insulating layer can be glued directly on top of the substrate with the conductive line, and consist of an adhesive layer and a thin polymer film. The latter may have the thickness of 100, 50, and preferably 30 µm.

Figure 6:
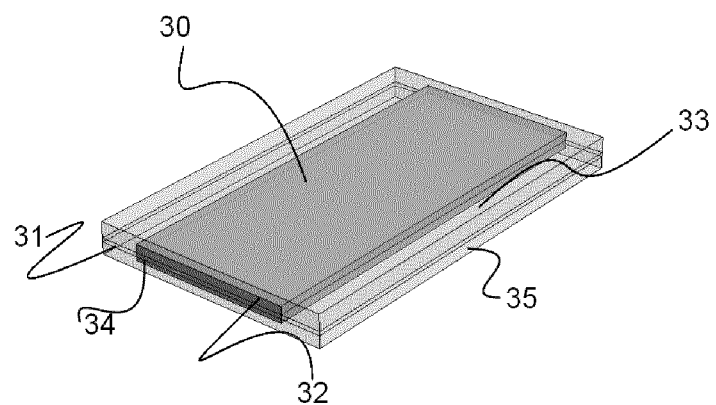
FIG. 6 represents another embodiment of a heating element 30 comprising a substrate 31, a first conductive layer 32, a first isolating layer 33, a second conductive layer 34 and a second isolating layer 35.
Figure 7:
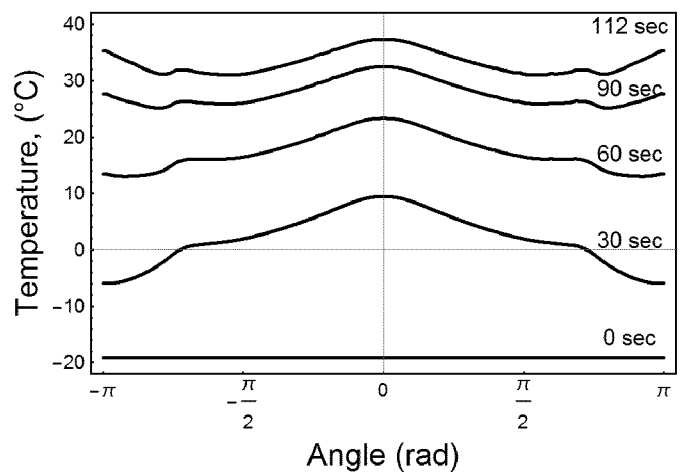
FIG. 7 illustrates some results of simulations of the steering wheels in the design corresponding to that in FIG. 4. The plot shows the temperature (in degrees Celsius, ° C.) around the wheel surface versus the angle (in radians) counted off from the middle of the heating element (where the angle is zero). The plot exhibits five distributions corresponding to different time moments. The corresponding time in seconds is written at the right edge of the plot above each curve. The requested distribution is achieved after 112 s, which is slightly shorter than two minutes.

Another embodiment 30 of the heating element is shown in FIG. 6. It differs from that shown in FIG. 5 by the second conductive layer 34 applied at the bottom of the substrate 31, in addition to the first conductive layer 32 applied at its top. Further, the second insulating layer 34 is applied on the bottom side in addition to the insulating layer 33 applied to the top side of the heating element. The adhesive material is placed on the bottom of the insulating layer 34 to enable its attachment to the steering wheel rim.

Alternatively, no insulating layer 34 may be used, while the adhesive material may be applied directly over the surface of the bottom conductive line and the marginal parts of the substrate.

The heating element 30 with two conductive stripes shown in FIG. 6 has the advantage with respect to that shown in FIG. 5 in that it is able to generate twice as much heat as the heating element 20 shown in FIG. 5, and therefore, can have a smaller lateral width. The same represents its advantage with respect to those printed directly on the rim surface.

A further aspect of the present invention is that the system is divided into a number of portions fixed along the steering wheel, but differently oriented with respect to the vertical direction, such a difference as, for example, shown in FIG. 1 and FIG. 2. Each such a device portion is characterized by its own relation of the thicknesses and widths of the portions of the highly thermally conductive layer, as well as the rotation angle of the second portion of the highly thermally conductive layer (as shown in FIG. 2) providing the best temperature homogeneity of the steering wheel surface for a given position of the mentioned portion on the steering wheel, thus, solving the problem of the different positions of the corresponding portion on the steering wheel and with respect to the gravity force. Preferentially the system is divided into four portions, even more preferred to divide it into six portions.

A further aspect of the present invention is the use of the electrically conductive, highly thermally conductive layer to build a second functionality, namely, enabling one the detection of the driver's hands being placed or removed from the wheel.

One embodiment of this second functionality is to use of the electrically conductive, highly thermally conductive layer as the first electrode for the "hands-off" capacitive sensor. To enable this functionality the car should be supplied by a second electrode of the capacitive sensor. The mentioned second electrode may be placed at the car roof, or more preferable, at the car driver sit directly below the trimmer or at any other suitable place, or both. The car should be, further, supplied by a controller to measure the electrical capacity between the mentioned second electrode and the mentioned first electrode. As soon as the driver removes his both hands from the wheel the electrical capacity will dramatically decrease, which should be registered as a signal.

Alternatively the car may be supplied by a device generating an alternating voltage applied between the mentioned first and second electrodes, and a device to measure an alternating electrical current in the circuit of these electrodes. Dramatic drop of this current will indicate the hands removed from the wheel.

Figure 8:
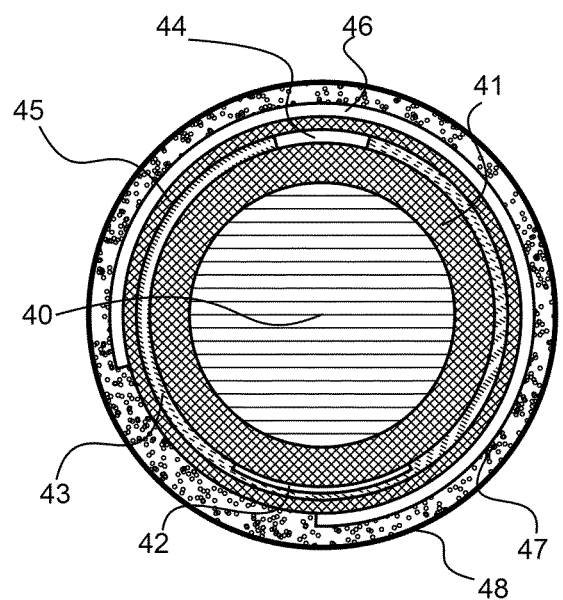
FIG. 8 is a cross-section of the steering wheel within one of the embodiments of the heated steering wheel with the "hands-off" detection function, wherein 40 is the wheel rim core, 41 is a polymer layer, 42 is a heating element, 43 is a first highly thermally conductive layer portion, 44 is a second highly thermally conductive layer portion, 45 is an insulating layer, 46 is a wheel-integrated electrode for the "hands-off" detection, 47 is a polymer foam, 48 is the wheel cover, such as e.g. natural or artificial leather.

Another embodiment enabling such second functionality is shown in FIG. 8. This design differs from that displayed in FIG. 4 by that the highly thermally conductive layer 43, 44 is covered by an insulation layer 45 and an electrically-conductive layer 46 that is applied on its top. The further layers represent the foam 47 and the cover layer 48, such as e.g., natural or artificial leather, or any other cover layer.

The role of the highly thermally conductive layer 43, 44 in this process is to screen the first electrode from any electric fields occasionally emerging within the steering wheel core, thus, ensuring the absence of false signals.

To achieve this aim the highly thermally conductive layer should be also highly electrically conductive. It should be, further, connected to a source of the constant voltage. This may be done by its connecting to the pole of the car battery.

Alternatively, it can be connected to the car mass. Another embodiment is its connection to a separate battery disconnected from the general car network. It may also be connected to a device providing a negative feedback.

Details of the design of the first "hands-off" detection electrode should depend upon the details of the steering wheel design and will vary from car to car. It should only be present within the wheel sector seized by the hands, and may consist of a solid electrode.

Figure 9:
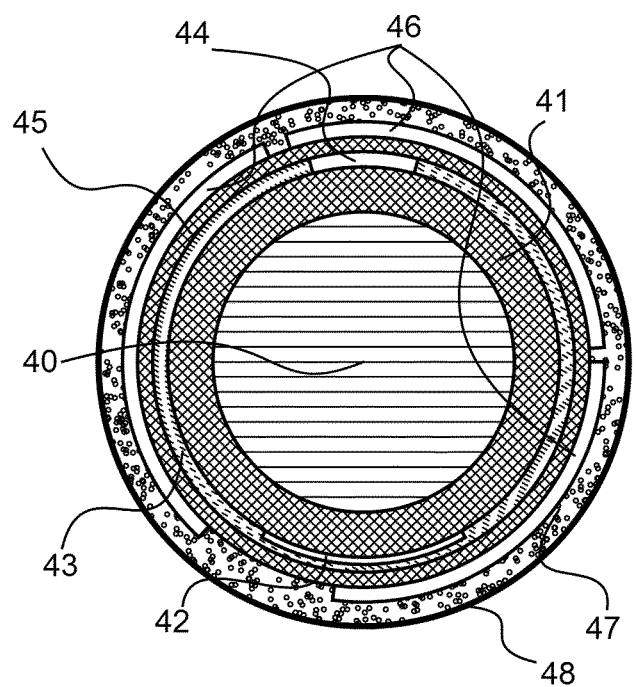
FIG. 9 is a cross-section of the steering wheel within the embodiments of the heated steering wheel with the "hands-off" detection function, wherein 40 is the wheel rim core, 41 is the polymer layer, 42 is the heating element, 43 is the first highly thermally conductive layer portion, 44 is the second highly thermally conductive layer portion, 45 is the insulating layer, 46 is the wheel-integrated fractionated electrode for the "hands-off" detection, 47 is the polymer foam, 48 is the wheel cover, such as e.g. natural or artificial leather.

Alternatively it may consist of electrically connected fractionated electrodes (as it is shown by 46 in FIG. 9) or of an electrode carrying voids, slits, cuts and/or holes enabling its application onto a toroidal surface. Alternatively, or it may consist of a conductive textile of any nature.

As for the way of application of the electrically insulating layer 45, it can be manufactured by any suitable method including but not limited to the dipping, spraying, screen or pad printing, gluing a thin insulating layer on top of the highly thermally conductive layer 43, 44 or applying an elastomeric insulating layer.

As for the way of application of the first "hands-off" detection electrode 46, it may be applied by any appropriate method, including but not limited to spraying, screen or pad printing, or gluing a thin electrode layer on top of the highly thermally conductive layer 45 or applying a textile layer.

The invention claimed is:

1. A composite heating device for homogeneous heating of a surface, wherein the composite heating device comprises a heating element and a multipart highly thermally conductive layer comprising at least two highly thermally conductive portions with different thermal conductivities, wherein a first portion of said at least two highly thermally conductive portions is in contact with the heating element, and wherein the heating element is small in surface as compared to the multipart highly thermally conductive layer, representing 2 to 40% of the surface of the multipart highly thermally conductive layer.

2. The composite heating device as claimed in claim 1, wherein the first portion is the thermally conductive portion having highest thermal conductivity, the thermal conductivity of the first portion expressed in W/(m·K) being at least 100% above that of the other portion(s).

3. The composite heating device as claimed in claim 1, wherein the first portion is made from a material which is the same than that of a further of the thermally conductive portion(s), the thermal conductivity of the other portion(s) having microstructures within said portion, the microstructures being selected from any one or more of voids, slits, cuts, holes and inclusions.

4. The composite heating device as claimed in claim 1, wherein the first portion is made from a material which is different from that of a further of the thermally conductive portion(s), the thermal conductivity of the other portion(s) having microstructures within said portion(s), the microstructures being selected from any one or more of voids, slits, cuts, holes and inclusions.

5. An article having a curved surface to be heated, comprising a composite heating device as claimed in claim 1.

6. The article as claimed in claim 5, wherein the article is a steering wheel having a rim wherein the heating element of the composite heating device is arranged at the bottom part of the steering wheel's rim.

7. The steering wheel as claimed in claim 6, wherein the heating element and the multipart thermally conductive layer are arranged symmetrically with respect to the vertical plane of the steering wheel's rim.

8. The steering wheel as claimed in claim 6, wherein the heating element and the multipart thermally conductive layer are arranged asymmetrically with respect to the vertical plane of the steering wheel's rim.

9. The steering wheel as claimed in claim 6, comprising a number of composite heating devices fixed at different locations of the rim of the steering wheel, wherein the size, power, orientation and positioning of each heating element and/or the size, orientation and positioning of each of their thermally conductive portions provide homogenous heating of the steering wheel.

10. The steering wheel as claimed in claim 6, wherein at least one thermally conductive portion of the multipart thermally conductive layer is part of a sensor.

11. The steering wheel as claimed in claim 10, wherein the sensor is a capacitive sensor arranged for hands-off detection.

12. The steering wheel as claimed in claim 11, wherein the multipart thermally conductive layer is also electrically conductive.

13. The steering wheel as claimed in claim 12, wherein the multipart thermally conductive layer serves as a first electrode for the hands-off detection.

14. The steering wheel as claimed in claim 12, wherein the multipart thermally conductive layer serves as a screen electrode for hands-off detection.

15. The steering wheel as claimed in claim 14, wherein a further first electrode is applied above said multipart thermally conductive layer with an intermediate insulating layer.

16. The composite heating device as claimed in claim 1, wherein the surface of the heating element is between 5 and 30% of the surface of the multipart highly thermally conductive layer.

17. The composite heating device as claimed in claim 2, wherein the thermal conductivity of the first portion is at least 250% above that of the other portion(s).

18. The composite heating device as claimed in claim 2, wherein the thermal conductivity of the first portion is at least 350% above that of the other portion(s).

* * * * *